(12) United States Patent
Phillips et al.

(10) Patent No.: US 7,844,497 B2
(45) Date of Patent: Nov. 30, 2010

(54) METHOD AND SYSTEM FOR FACILITATING SHIPPING VIA A THIRD-PARTY PAYMENT SERVICE

(75) Inventors: Brian Andrew Phillips, San Francisco, CA (US); Chad Meredith Hurley, Palo Alto, CA (US); Greg Cervelli, San Jose, CA (US); Ki Ching Wong, Sunnyvale, CA (US); Paul Arthur Martin, Menlo Park, CA (US); Steve Chen, San Jose, CA (US); Yu Pan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 617 days.

(21) Appl. No.: 10/749,682

(22) Filed: Dec. 31, 2003

(65) Prior Publication Data

US 2005/0071244 A1    Mar. 31, 2005

Related U.S. Application Data

(63) Continuation-in-part of application No. 10/465,352, filed on Jun. 18, 2003.

(51) Int. Cl.
G06Q 30/00     (2006.01)

(52) U.S. Cl. .......................................... 705/26; 705/27
(58) Field of Classification Search .................. 705/26, 705/27

See application file for complete search history.

(56) References Cited

U.S. PATENT DOCUMENTS

| | | | |
|---|---|---|---|
| 4,958,280 A * | 9/1990 | Pauly et al. ..................... 705/3 |
| 5,778,178 A | 7/1998 | Arunachalam | |
| 5,987,500 A | 11/1999 | Arunachalam | |
| 6,108,639 A * | 8/2000 | Walker et al. .................. 705/26 |
| 6,122,624 A | 9/2000 | Tetro et al. | |
| 6,151,588 A * | 11/2000 | Tozzoli et al. .................. 705/37 |
| 6,212,556 B1 | 4/2001 | Arunachalam | |

(Continued)

OTHER PUBLICATIONS

Brewin, Bob, "UPS: tightly linked to its customers", Computerworld, Mar. 19, 2001.*

(Continued)

*Primary Examiner*—Mark Fadok
(74) *Attorney, Agent, or Firm*—Schwegman, Lundberg & Woessner, P.A.

(57) ABSTRACT

An integrated shipping scheme enables users of a third-party payment service to facilitate shipment of packages via a shipping vendor. Web pages corresponding to a web site hosted by the third-party payment service enable a sender to enter ship to: information, while ship from: information may be automatically gathered or manually entered by the sender. The sender is also enabled to enter shipment options, such as package size and weight. Corresponding shipping information is generated and sent "behind the scenes" to a selected shipping vendor. The shipping vendor processes the shipping information, and returns shipment data, including data to generate a shipping label. A web page containing the shipping label is then generated and served to a client operated by the sender, enabling the shipping label to be printed out. At the same time, electronic payment transfer operations are performed to effectively transfer payment from the sender directly to the shipping vendor via the third-party payment service in a manner that is transparent to both the sender and the shipping vendor.

9 Claims, 18 Drawing Sheets

U.S. PATENT DOCUMENTS

| | | | |
|---|---|---|---|
| 6,263,317 B1* | 7/2001 | Sharp et al. | 705/26 |
| 6,463,420 B1 | 10/2002 | Guidice et al. | |
| 6,594,641 B1* | 7/2003 | Southam | 705/26 |
| 6,748,366 B1* | 6/2004 | Hurwitz et al. | 705/53 |
| 6,830,179 B2 | 12/2004 | Korhonen et al. | |
| 7,024,391 B2 | 4/2006 | Burich | |
| 7,076,449 B2* | 7/2006 | Tsunenari et al. | 705/26 |
| 7,197,465 B1* | 3/2007 | Hu et al. | 705/1 |
| 7,266,513 B2* | 9/2007 | Chalmers et al. | 705/26 |
| 7,324,968 B2* | 1/2008 | Rotman et al. | 705/37 |
| 2001/0023410 A1* | 9/2001 | Hayes et al. | 705/26 |
| 2001/0037316 A1* | 11/2001 | Shiloh | 705/74 |
| 2001/0044787 A1 | 11/2001 | Shwartz et al. | |
| 2002/0013739 A1* | 1/2002 | O'Donnell et al. | 705/26 |
| 2002/0013744 A1* | 1/2002 | Tsunenari et al. | 705/28 |
| 2002/0032613 A1* | 3/2002 | Buettgenbach et al. | 705/26 |
| 2002/0032668 A1* | 3/2002 | Kohler et al. | 705/401 |
| 2002/0046130 A1* | 4/2002 | Monteleone et al. | 705/26 |
| 2002/0049622 A1* | 4/2002 | Lettich et al. | 705/7 |
| 2002/0116305 A1* | 8/2002 | Abhyanker | 705/35 |
| 2002/0152093 A1* | 10/2002 | Chalmers et al. | 705/1 |
| 2002/0152174 A1* | 10/2002 | Woods et al. | 705/60 |
| 2003/0033260 A1* | 2/2003 | Yashiro et al. | 705/400 |
| 2003/0040947 A1 | 2/2003 | Alie et al. | |
| 2003/0212631 A1 | 11/2003 | Foth et al. | |
| 2003/0217017 A1* | 11/2003 | Willoughby et al. | 705/404 |
| 2004/0002903 A1 | 1/2004 | Stolfo et al. | |
| 2004/0117384 A1 | 6/2004 | Ray | |
| 2004/0153370 A1* | 8/2004 | Yang | 705/26 |
| 2004/0153424 A1* | 8/2004 | Lussow et al. | 705/400 |
| 2004/0220845 A1 | 11/2004 | Malapitan | |
| 2004/0243480 A1 | 12/2004 | Gross | |
| 2004/0260615 A1 | 12/2004 | Phillips et al. | |
| 2005/0027618 A1 | 2/2005 | Zucker et al. | |
| 2005/0033671 A1 | 2/2005 | Hahn-Carlson | |
| 2005/0071244 A1* | 3/2005 | Phillips et al. | 705/26 |
| 2005/0171862 A1* | 8/2005 | Duncan | 705/26 |
| 2005/0278263 A1 | 12/2005 | Hollander et al. | |

OTHER PUBLICATIONS

"International Search Report and Written Opinion PCT/US04/19691", PCT/US04/19691, (Aug. 23, 2005), pp. 1-8.

Bray, Pauk, ""'Buy-Side,' 'Sell-Side' Meet at the Hub,""", *Sunday Times*, London, (UK), (Dec. 3, 2000),B.2-B.5.

Wallis, Keith, "Shipping Lines Offer More Net Services", *Hong Kong iMail*, Hong Kong, (Dec. 7, 2001), 1.

"U.S. Appl. No. 10/465,352, Response filed Oct. 1, 2007 to Non-Final Office Ction mailed Jul. 13, 2007", 12 pgs.

"U.S. Appl. No. 10/465,352 Final Office Action mailed Jan. 30, 2007", 17 pgs.

"U.S. Appl. No. 10/465,352 Non Final Office Action mailed Jun. 20, 2006", 19 pgs.

"U.S. Appl. No. 10/465,352 Non Final Office Action mailed Jul. 13, 2007", 17 pgs.

"U.S. Appl. No. 10/465,352 Response filed May 17, 2007 to Final Office Action mailed Jan. 30, 2007", 13 pgs.

"U.S. Appl. No. 10/465,352 Response filed Nov. 20, 2006 to Non Final Office Action mailed Jun. 20, 2006", 12 pgs.

"U.S. Appl. No. 10/465,352, Response Filed Mar. 12, 2008 to Final Office Action mailed Dec. 28, 2007", 12 pgs.

"U.S. Appl. No. 10/465,352, Final Office Action mailed Dec. 28, 2007", FOAR, 17 pgs.

\* cited by examiner

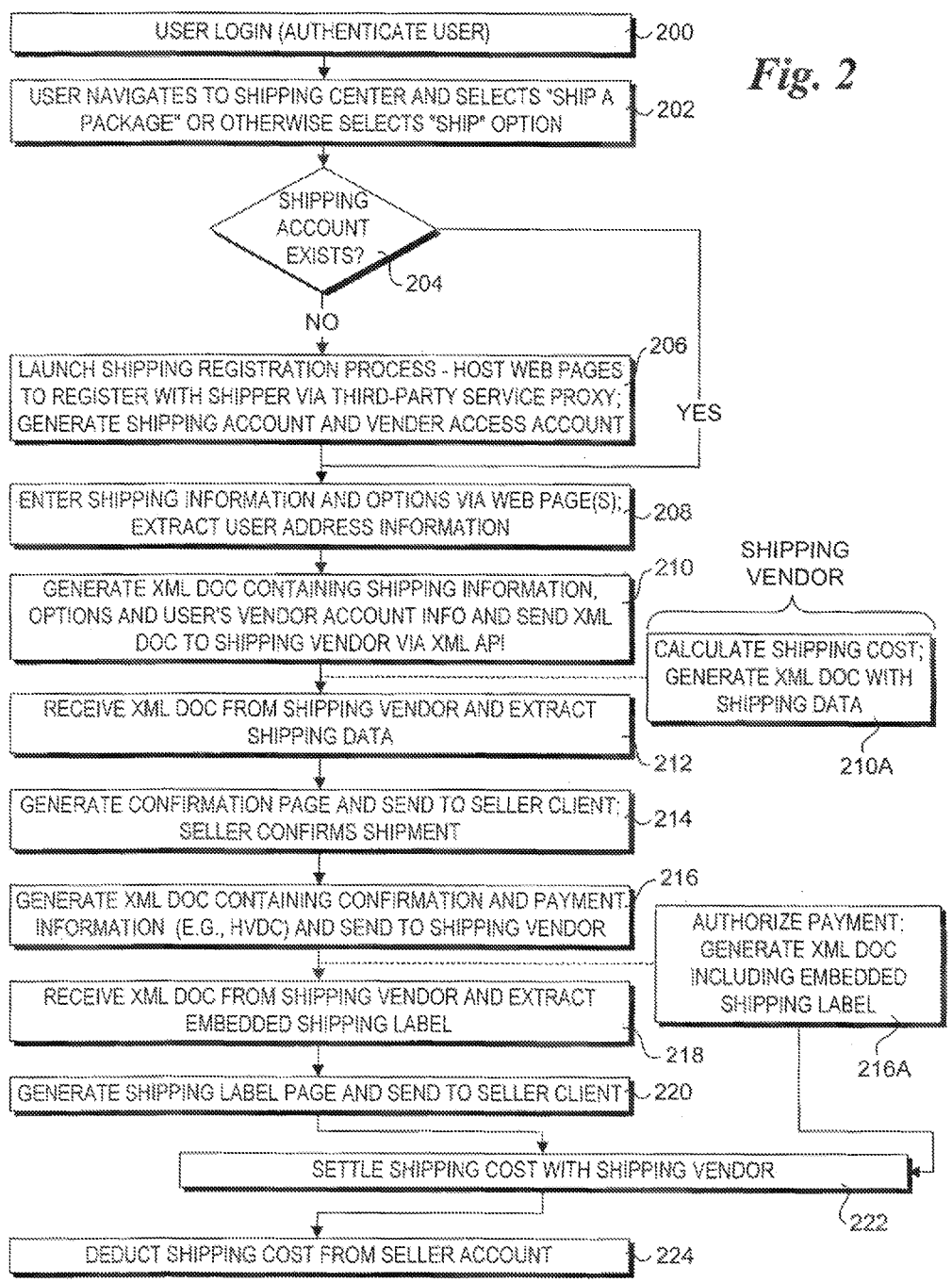

PayPal Shipping Center

Now you can create pre-paid shipping labels for all of your packages, directly from your PayPal account. We're proud to introduce UPS as our first carrier. Benefits:

See Demo

Here's how it works:
1. Pack your item in your own packaging or in UPS packaging
2. Weigh and measure your package
3. Create a UPS Shipping label online with your PayPal account
4. Your PayPal account will be charged the UPS Shipping fee
5. Print your UPS Shipping label and attach it to your package†
6. Your package is ready to go! Just drop it off at any authorized UPS location or hand it to a UPS driver Ship A Package — 302 eBay Sellers: To ship an item sold on eBay, use PayPal's Auction Manager.
† Your printer must produce labels that are clear enough to be scanned correctly. Learn more

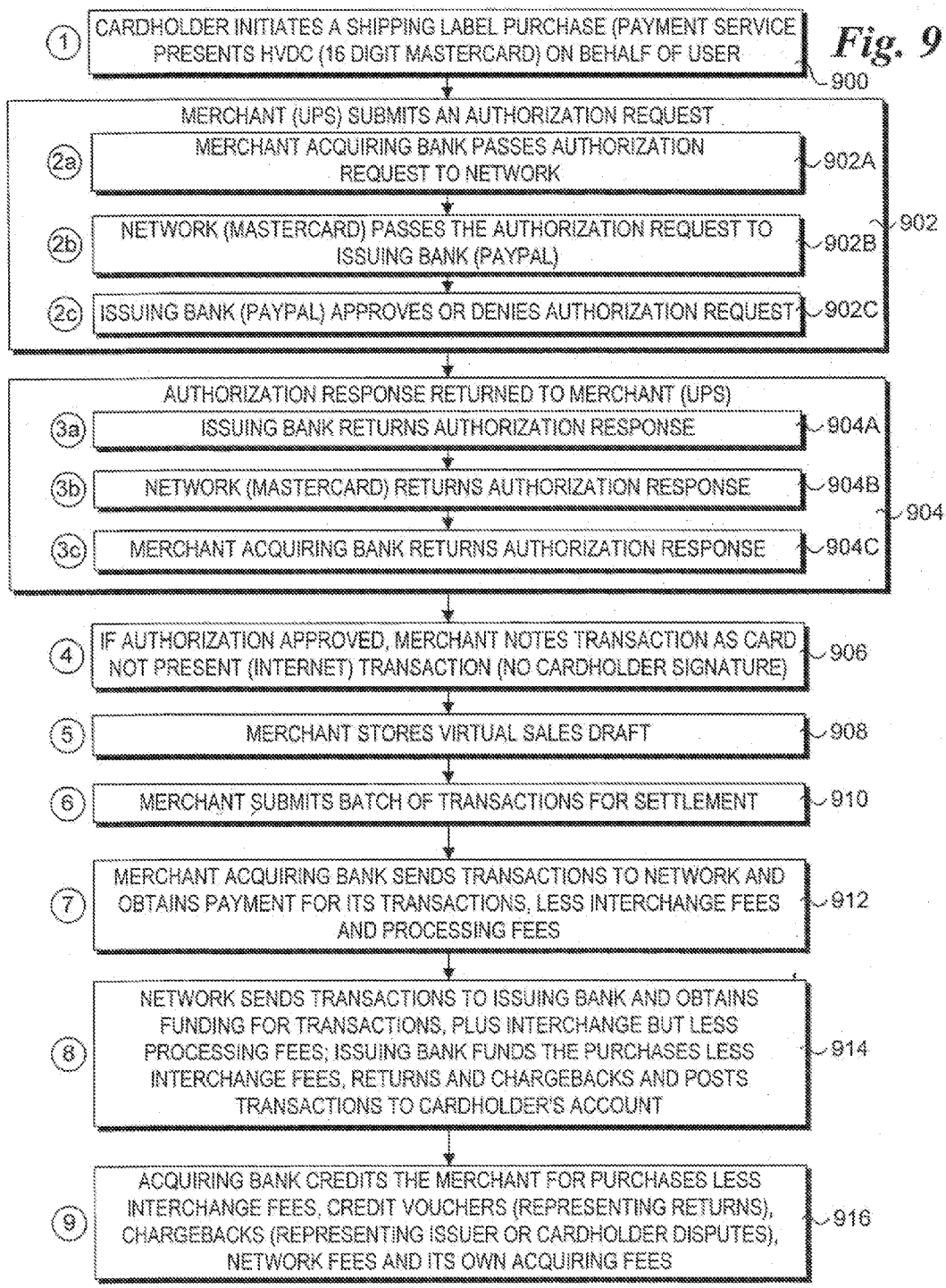

METHOD AND SYSTEM FOR FACILITATING SHIPPING VIA A THIRD-PARTY PAYMENT SERVICE

CROSS-REFERENCE TO RELATED APPLICATION

The present application is a continuation-in-part of application Ser. No. 10/465,352, filed Jun. 18, 2003, the benefit of the priority date for which is claimed under U.S.C. §120.

FIELD OF THE INVENTION

The field of invention relates generally to electronic commerce and, more specifically but not exclusively relates to a method and architecture that provides a mechanism for enabling users of a third-party (electronic) payment service to arrange and pay for shipment of goods via a shipping vender using facilities hosted by the third-party payment service.

BACKGROUND INFORMATION

The past decade has seen a tremendous growth in the use of the world-wide-web (WWW) for online purchases of products and services. In one respect, such products are available via web sites provided by e-commerce merchants, such as electronic retailers. Typically, payment of products purchased from e-commerce merchants are made by means of electronic credit-card transfers. In most instances, the final transaction price reflects a total price for the purchased goods, applicable taxes, and shipping costs to pay for delivery of goods to the buyer. Generally, e-commerce merchants will employ business accounts or the like with one or more shipping companies that facilitate delivery of the goods sold by that merchant. Some smaller merchants may employ shippers on an as-needed basis, paying cash at the point of service.

Another type of electronic purchase that has seen exponential growth is individual seller-to-buyer transactions (a.k.a. person-to-person transactions), wherein neither the seller nor the buyer is a merchant. A common form of this type of transaction is the online auction, such as auctions facilitated by eBay® Corporation, San Jose, Calif. Third-party online auction hosts, such as eBay®, provide a web-based platform that enables sellers to list and display items for sale, and buyers to bid on the items that are offered. Typically, upon expiration of the auction period or other auction-ending event, the user that has submitted the highest bid "wins" the auction, and thus becomes the buyer. Optionally, the auction can be terminated when a predetermined bid amount has been received by a user. At this point, both the seller and buyer are apprised of the result of the auction (typically via e-mail), which initiates the physical transfer of the goods to the buyer and payment from the buyer to the seller.

A typical transfer cycle proceeds as follows. First, a final price is determined that includes the shipping cost. This cost may be set in advance of the auction (i.e., one or more fixed prices listed in the auction for various shipping options), or may be determined on an actual shipping cost basis. In the latter instance, the seller must first determine the shipping costs prior to determining the final price. Depending on the shipping method, shipping price information can generally be obtained from shipping cost tables and the like. Several of the large shipping vendors (e.g., United Parcel Service (UPS), Federal Express, etc.) provide online estimators to assist with this process. After the final price is determined, the seller typically sends in e-mail to the buyer, identifying payment options (these may also be identified via the auction listing). In response, the buyer employs one of the payment options to pay for the item plus the shipping cost.

Oftentimes, the seller of the auctioned item is an individual, although online auctions are very popular for merchants as well. Most individuals do not have credit-card merchant accounts, so they cannot accept this form a payment. As such, the selected form a payment will generally be limited to a money order, cashier's check, or personal check. Another popular option in this case is to use a third-party payment service, such as PayPal®, Mountain View, Calif. In this instance, payment may be made electronically directly to the recipient's (seller's) payment service account (and hence to the seller's personal bank account listed with the payment service or to the seller via other forms of payment), either through use of a similar payment service account for the buyer, or via a credit card payment to the payment service.

Upon receipt and clearance of the payment, the seller will generally go to the selected shipping vendor and pay for the shipment via a cash transaction, since most individual on-line sellers do not have business accounts with shipping companies. This is very time-consuming, often resulting in a delay in the overall transaction process. For example, it may be inconvenient for the seller to go to a selected shipping vendor shortly after being notified that payment has been received for a given sales transaction. Furthermore, this places an extra burden on the seller. In fact, this can be such a burden that many potential auctions are never initiated, since the owners of lower-priced auctionable items consider the "personal" (i.e., non-monetary) cost of facilitating shipment of the items to be too great relative to the auction value of the items. For example, while a $10.00 item may only cost $3.00 to ship, it may not be worth it for a potential seller to spend 30 minutes or more in connection with shipping the item.

SUMMARY OF THE INVENTION

In accordance with aspects of the present invention, an integrated shipping scheme is disclosed that enables users of a third-party payment service to facilitate shipping transactions in connection with shipment of packages to recipients. After authentication, a user may navigate a web site hosted by the third-party payment service and select to ship a package. Appropriate shipping information is then automatically gathered and/or entered by the sender and sent "behind the scenes" to a selected shipping vendor. The shipping vendor processes the shipping information, and returns shipment data, including data to generate a shipping label to the third-party payment service. A web page containing the shipping label is then generated and served to a client operated by the sender and displayed on a browser screen, enabling the shipping label to be printed out by the sender. To ship an item, the sender merely has to affix the shipping label to an appropriate shipping package (e.g., box) and either drop the package off at one of the shipper's drop-off sites, or have the shipper come to the seller's location to pick up the package. At the same time, electronic payment transfer operations are performed to effectively transfer payment from the sender directly to the shipping vendor via the third-party payment service in a manner that is transparent to both sender and the shipping vendor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1b is a schematic diagram illustrating generation and transfer of an XML document containing shipping information from a third-party payment service to a shipping vendor in accordance with the infrastructure of FIG. 1a;

FIG. 1c is a schematic diagram illustrating receipt of an XML document containing shipment data from the shipping vendor and processing of the shipment data to generate a confirmation web page hosted by the third-party payment service in accordance with the infrastructure of FIG. 1a;

FIG. 1d is a schematic diagram illustrating generation and transfer of an XML document containing shipping confirmation and payment data from the third-party payment service to the shipping vendor in accordance with the infrastructure of FIG. 1a;

FIG. 1e is a schematic diagram illustrating receipt of an XML document containing shipment transaction data and an embedded shipping label from the shipping vendor and processing of the XML document to generate a web page hosted by the third-party payment service via which a sender may print out the shipping label in accordance with the infrastructure of FIG. 1a;

FIG. 2 is a flowchart illustrating operations and logic performed by software components operated by the third-party payment service to facilitate arrangement and payment of shipment services provided by the shipping vendor in accordance with one embodiment of the invention;

FIG. 3 is a representation of a personal account web page hosted by the third-party payment service that contains a button for launching an integrated shipping process;

FIG. 4b is a representation of a shipping vendor registration page that contains input fields and controls for entering registration information that is proxied to a corresponding web registration facilities provided by the shipping vendor;

FIG. 5 is a representation of a shipping options web page via which a user may enter shipping information and options pertaining to a shipment;

FIG. 6 is a representation of a shipping confirmation web page via which shipment data are confirmed by the user;

FIG. 9 is a flowchart illustrating operations performed during a payment transfer via the credit card network of FIG. 8;

DETAILED DESCRIPTION OF PREFERRED EMBODIMENTS

Embodiments of method and schemes for facilitating integrated shipping via a third party payment service are described herein. In the following description, numerous specific details are set forth, such as transactions performed in the context of an online auction and subsequent payment activities, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
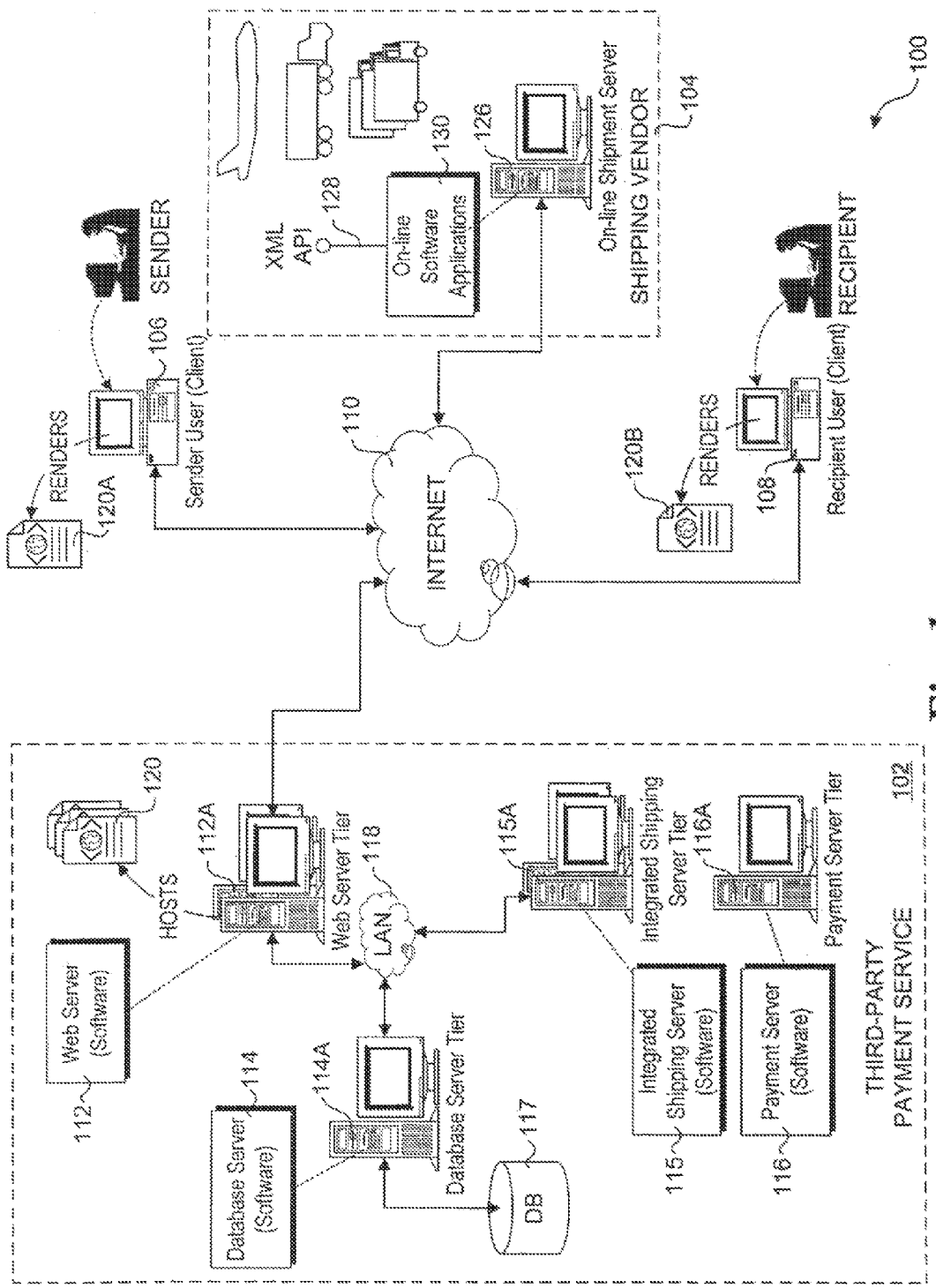
FIG. 1a is a schematic diagram illustrating an exemplary infrastructure for supporting third-party payment services with integrated shipping in accordance with one embodiment of the invention.

An overview of a network infrastructure 100 for supporting third-party payment services with integrated shipping in accordance with one embodiment of the invention is shown in FIG. 1a. The primary entities include a third party payment service 102, a shipping vendor 104, and respective sender and receiver user clients 106 and 108, each of which is linked in communication with other entities via the Internet 110.

The third-party payment service 102 employs a plurality of software components embodied as software servers that operate in combination to perform various operations, including a web server 112, database server 114, an integrated shipping server 115 and a payment server 116. Database server 114 is used to access data stored in a database (DB) 117. As is well-known in the distributed software arts, servers 112, 114, 115, and 116 represent software components that perform web server, database server, integrated shipping server, and payment transaction operations, respectively. As such, the servers may by deployed in an n-tier environment, wherein one or more computer servers are used to host server software running in each tier. For example, in FIG. 1a, web server 112, database server 114, integrated shipping server 115, and payment server 116 are deployed on respective computer servers tiers 112A, 114A, 115A, and 116A comprising computer servers coupled in communication via a local area network (LAN) 118. Optionally, the software server components may be deployed across three, two, or even a single computer server. Under a typical 3-tier architecture, integrated shipping server tier 115A and payment server tier 116A occupy an application server tier (or middle tier), while web server tier 112A (a.k.a., the frontend) corresponds to a first tier and database server tier (a.k.a., the backend) occupies a third tier. Accordingly, integrated shipping server and payment server software components are known as "middleware."

Web server 112 is used to host a plurality of web pages 120, such as HTML pages. Web server 112 also includes appropriate network interfaces for enabling data to be passed to and received from other entities via Internet 110. For example, data passed between web server 112 and clients 106 and 108 will typically employ the HTTP (hyper-text transport protocol) transport mechanism, wherein respective HTTP interfaces are provided at each of the web server 112 and the clients. Generally, the HTTP interface at each of clients 106 and 108 will be provided by a web browser running on the clients, such as but not limited to Microsoft Internet Explorer and Netscape Navigator. The browsers are used to render web pages 120A and 120B in response to corresponding web page data (e.g., HTML content) received from web server 112. A similar network interface is likewise provided by an on-line shipment server 126 hosted by shipping vendor 104.

During typical operations, third-party payment service 102 enables payments to be transferred between user parties, such as between a buyer and seller in connection with an online auction. Generally, payment transfer transactions are facilitated via web pages hosted by web server 114, (e.g., web pages 120). In order to receive funds via use of third-party payment service 102, a user must first establish a user account. To open an account, a user will enter registration and authentication information, including a unique user identifier and password, as well as contact information. In most instances, the user will also enter banking information and authorize the third-party payment service to act as an agent for the user with respect to a particular bank account, thereby enabling monetary funds to be received by and transferred from the user's bank account via requests made by the third-party payment service.

In accordance with aspects of the invention, the foregoing "normal" services provided by the third-party payment service are augmented to include integrated shipping, wherein the payment service 102 operates as a proxy to enable shipping services offered by a selected shipping vendor to be accessed in a manner that does not require the user to directly interface with the shipping vendor. Furthermore, in one embodiment the shipping integration process is performed in a manner that is completely transparent to the shipping vendor as well—that is, from the shipping vendor's perspective, the use of the shipping vendor's on-line access facilities appears that same as if an individual user was accessing those facilities, rather than the third-party payment service. As a result, there are no changes that need to be made to the shipping vendor's on-line infrastructure.

With reference to FIG. 2, a third-party-facilitated shipment transaction process including integrated shipping in accordance with one embodiment proceeds as follows. The process begins in a block 200, wherein a user of the third-party payment service is authenticated through a login process. For example, the user may navigate in a web browser to a web site hosted by the third-party payment service, and then login to the service via an authentication or login web page. Typically, the authentication will involve the aforementioned user identification (userID) and password or passcode. Authentication information is stored in database 117. In response to the values entered by the user, appropriate data from database 117 are retrieved to authenticate the user.

Once the user is authenticated, the user is enabled to navigate various pages corresponding to the third-party payment service web site. In accordance with operations performed in a block 202, this includes navigation to a shipping center, which in one embodiment may be accessed through a "Merchant Tools" tab on a web page 300 shown in FIG. 3. A user may select to arrange for a shipment by selecting a "Ship A Package" link 302 on web page 300. Optionally, the user may select to arrange for shipment via other web pages using similar links or buttons (not shown).

In response to activation of "Ship A Package" line 302 in block 202, a determination is made in a decision block 204 to whether the user has an existing shipping account. In one embodiment, a separate shipping account is set up for each user to enable the user to access shipping services provided by a corresponding shipping vendor. When multiple shipping vendors are available, a shipping account with separate shipping vendor-specific information (e.g., via vendor-specific tables) is set up. As discussed above, in one embodiment shipping integration is performed in a manner that is transparent to the shipping vendor, such that the shipping vendor believes it is providing services directly to an individual customer. Accordingly, in order to "trick" the shipping vendor into believing it is interacting with an individual user, a corresponding user account must first be set up with the shipping vendor.

In one embodiment, user registration with the shipping vendor is provided in a block 206 by employing the third-party payment service as a proxy. Details of how the proxy works are discussed below with reference to the transfer of shipping data and the like. In short, the proxy function works by providing a "front-end" (e.g., web pages) to a user to enable the user to interact with the payment service. At the same time, data entered by the user (e.g., sign-up information) is converted into a predefined format and passed to the shipping vendor via one or more XML (extended markup language) documents. The XML documents are configured to comply with an XML API (application program interface) 128 provided by on-line shipment server 126 to enable interaction between applications 130 running on the on-line shipment server and applications running external to the on-line shipment server (such as applications hosted by third-party payment service 102). Likewise, data is passed back to the third-party payment service from the shipping vendor via XML documents that comply with the XML API.

Figure 4A:
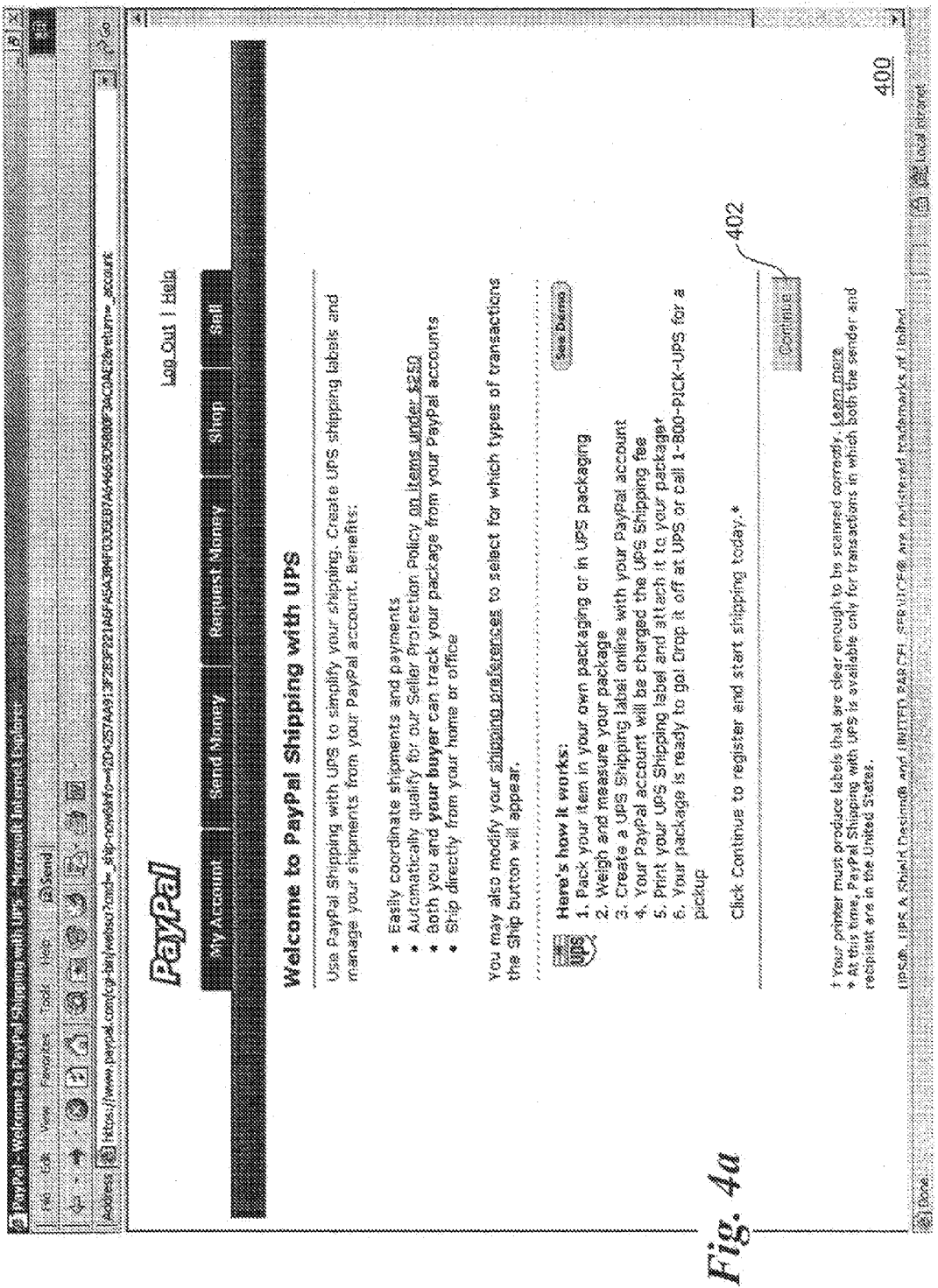
FIG. 4a is a representation of a welcome web page containing information for using integrated shipping via an exemplary shipping vendor.
Figure 4B:
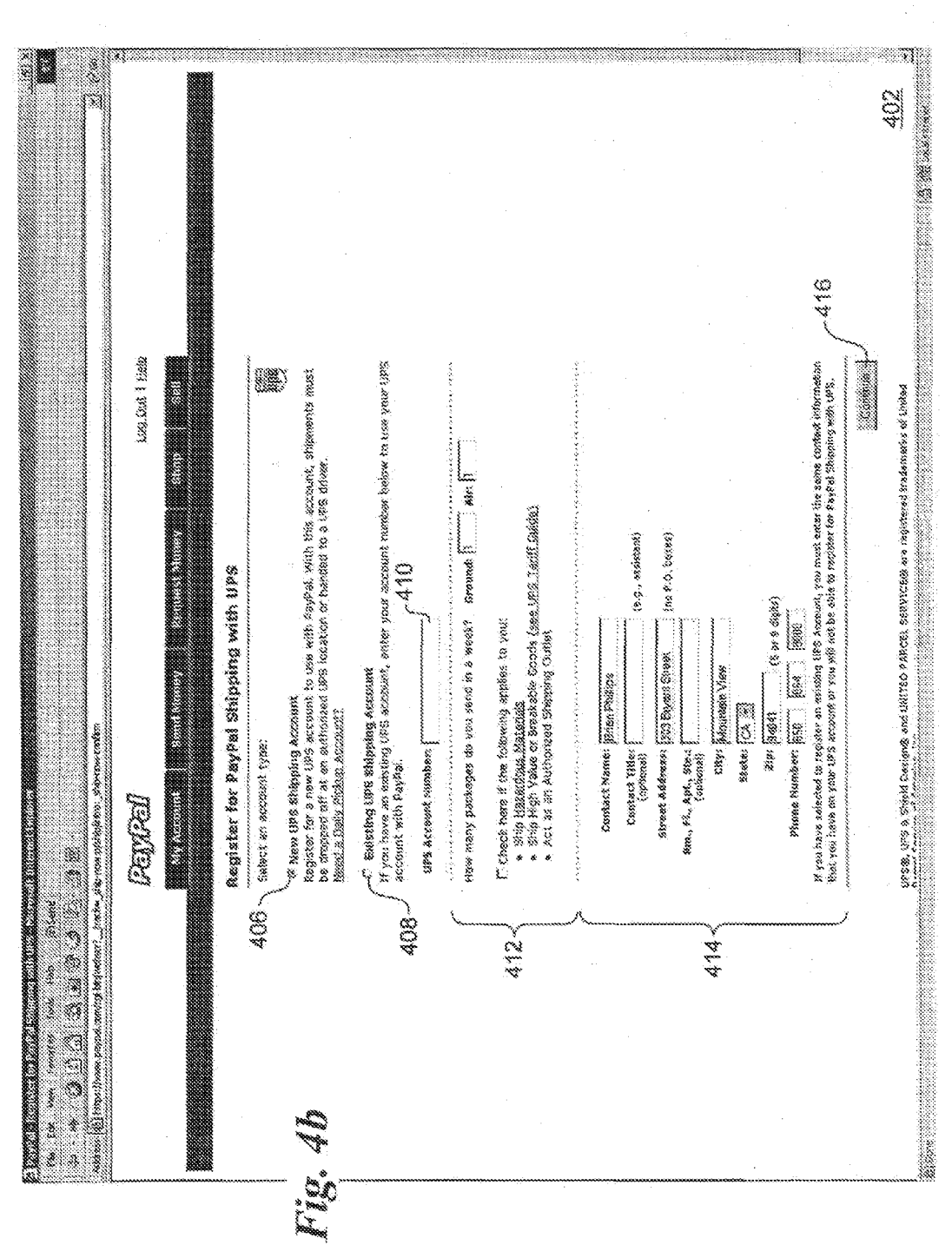

A welcome page 400 and exemplary shipping registration page 402 are respectively shown in FIGS. 4a and 4b. In the illustrated embodiment and the example described below, the shipping vendor is UPS. It is noted that this is not limiting, as the general principles of the invention may be implemented to employ various other shipping vendors as well. Welcome page 400 contains an overview of how integrated shipping is employed from a user perspective. Activation of a "Continue" button 404 advances the user to shipping registration page 402.

A pair of radio buttons 406 and 408 are displayed in the upper portion of the shipping registration page. If the user does not have an existing vendor shipping account, the user will activate radio button 406. If the user has an existing vendor shipping account, the user will activate radio button 408 and enter the account number in an edit box 410. Optionally, the account number, which has been previously obtained via the process described below, is retrieved from database 117 and is automatically filled in.

In a middle portion 412 of the page, the user is asked to enter information relating to shipping frequency and requests for less common shipping services, such as whether the user ships hazardous materials, high value good, breakable goods, etc. User-specific information is entered on the lower portion 414 of the page, including contact name, optional contact title, address information, city, state, zip code, and phone number data. In response to activation of a "Continue" button 416 the user is presented with a confirmation screen (not shown) via which the user confirms the user-entered data. A shipping agreement form (also not shown) is then presented to the user to enable the user to review the shipping agreement offered by the shipping vendor. In response to activation of an "I Agree" button, a request for a new account is submitted behind the scenes to the shipping vendor.

If the entered data are found to be acceptable, the shipping vendor will issue a new account number. The account number is presented to the user via a registration completion notification page (not shown), while also being stored in database 117 with a link to the user's userID. In one embodiment, a second account number is also issued to enable the user to access UPS' "myUPS.com" services for purposes such as package tracking.

Figure 5:
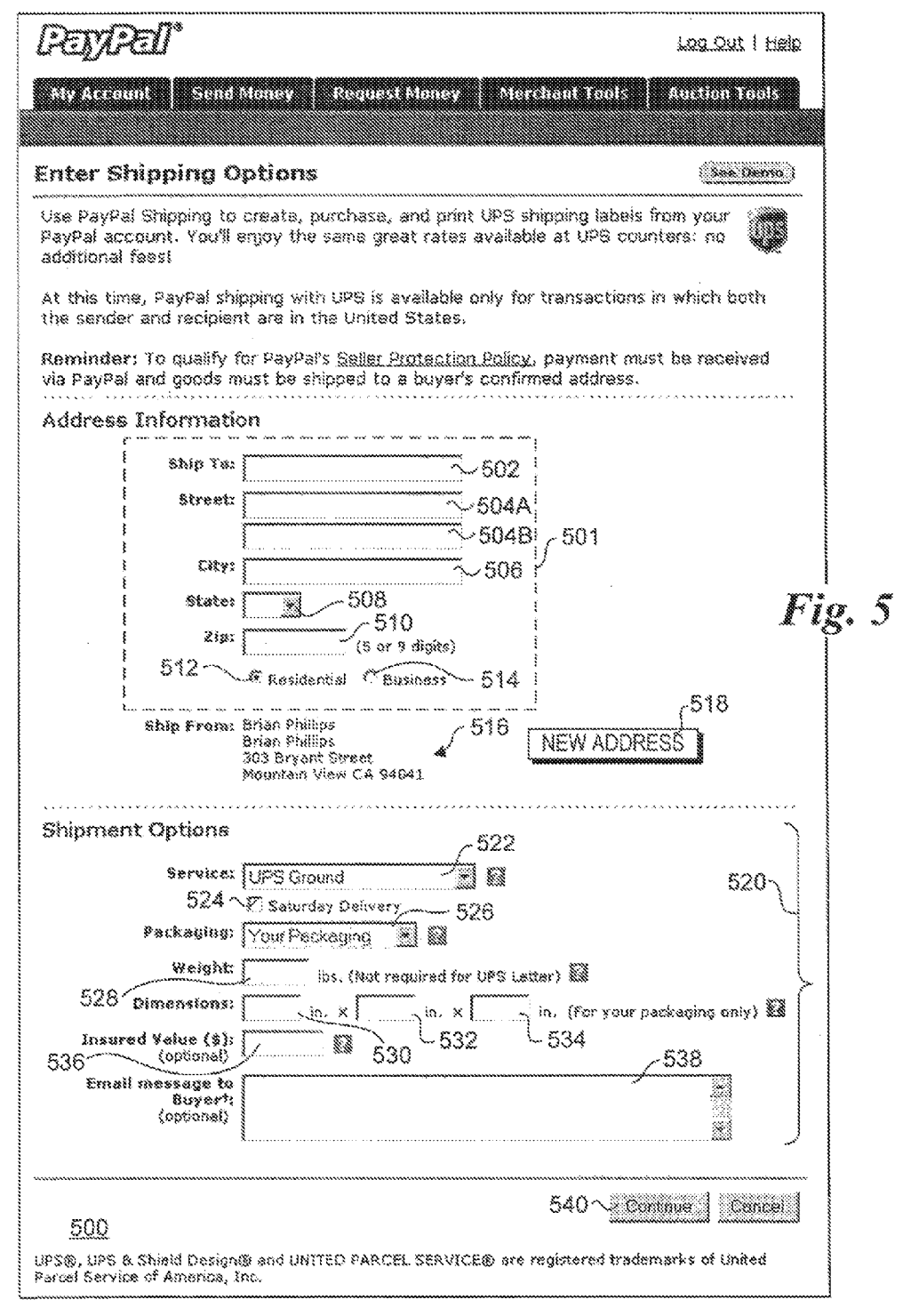

After registration is complete (or if the user already had an active account), the user is presented with a shipping options page 500 shown in FIG. 5 via which shipping information and options are entered in accordance with a block 208. Address information corresponding to shipment recipient address are entered in a recipient address information section 501. This includes a Ship to: edit box 502, first and second street address edit boxes 504A and 504B, a City: edit box 506, a State: pulldown control 508 and a Zip code edit box 510. A radio control group including a residential selection 512 and a business selection 514 enable the user to specify the type of recipient; this information will typically used to determine shipment costs, wherein shipments to businesses may cost less than shipments of the same packages to residential addresses. In one embodiment, the recipient address information also includes an edit box 515 for entering an e-mail address for the recipient.

Below the recipient shipping information 501 is sender address information 516. Generally, the "Ship From:" address 516 will correspond to either the home or business address listed with the shipping vendor or the primary address listed with the third-party payment service. In one embodiment, a query is made to database 117 to automatically populate sender address information 516 based on the current user session (which includes the userID for the current user) an and applicable mode (e.g., use shipping vendor registered address or use third-party payment service primary address). In cases in which multiple addresses are registered, a list of those addresses displayed opposite respective radio buttons will be displayed to the user to enable the user to select a ship from address via selection of its corresponding radio button.

In one embodiment, activation of a "New Address" button 518, enables a user to manually enter ship from information. For example, if a user was away from his home or business and wanted to use the shipment service the user would enter a ship from address that was different than the user's registered address. Activation of "New Address" button will launch a pop-up dialog containing edit controls similar to those provided in recipient address information section 501.

Shipping parameters and shipping option data are entered or selected via various edit boxes and pull-down controls in the "Shipment Options" section 520. The parameters and options include a shipping service type via a pull-down control 522, a Saturday delivery option checkbox 524, a packaging type via a pull-down control 526, a package weight via an edit box 528, and package dimensions via edit boxes 530, 532, and 534. An optional insured value may be entered in an edit box 536, while an optional e-mail message to the recipient may be entered in an edit box 538.

Figure 1B:
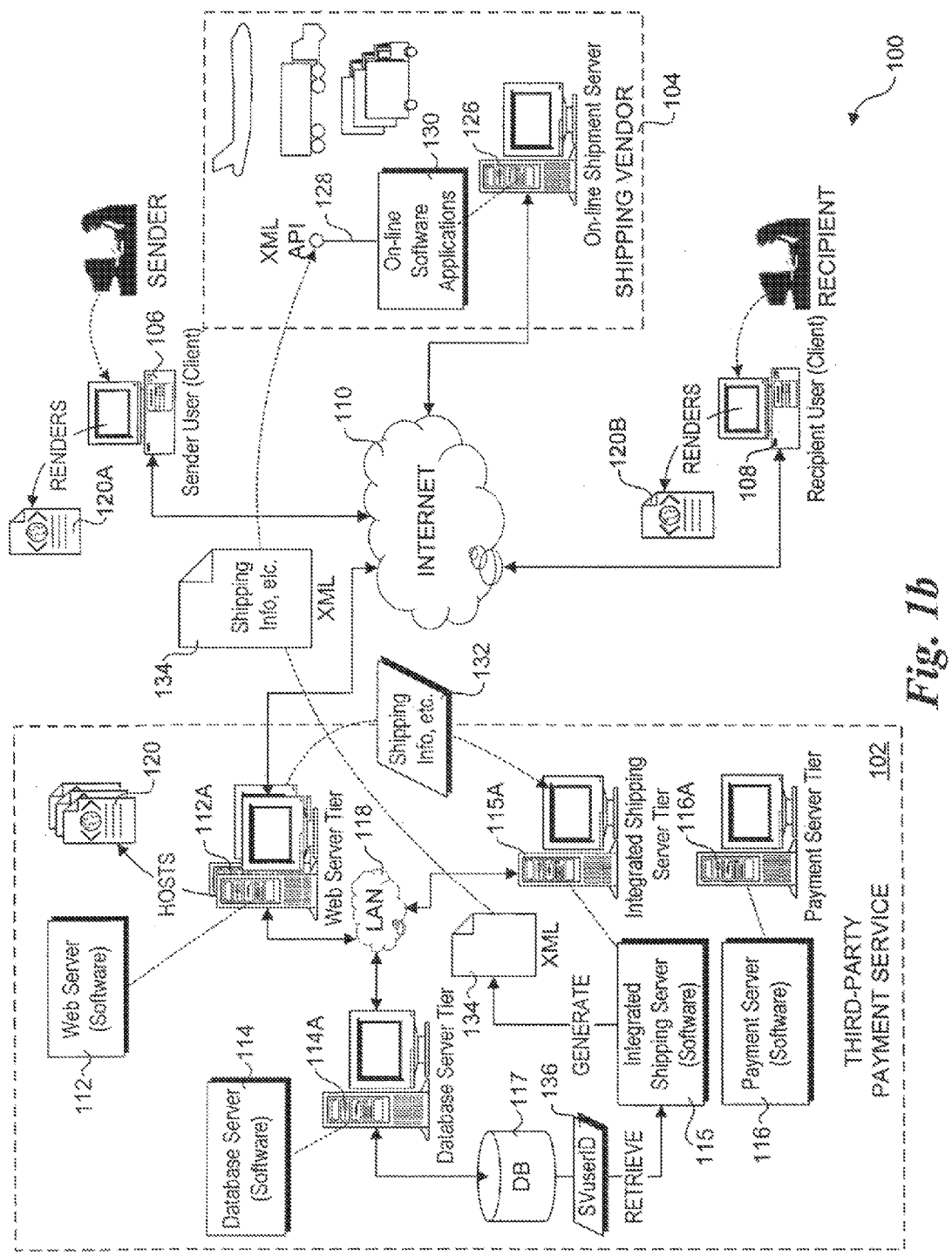

After the shipping information has been entered via shipping options page 500, the user will activate a continue button 540. In response, web server 112 will pass the underlying data 132 to integrated shipping server 115 to begin performing the operations of block 210. During these operations, integrated shipping server 115 generates an XML document 134 containing the shipping information, options, and the user's vender account information (e.g., SVuserID 136 retrieved from database 117), as shown in FIG. 1b. The XML document is structured to comply with XML API 128, which in this exemplary embodiment comprises an API that enables companies to interact with UPS' on-line services in a transparent fashion. In other words, from the perspective of on-line software applications 130, data received by the applications have been input via UPS' normal on-line data input facility (i.e., web pages hosted by the UPS web site). This scheme enables external applications effectively to function as proxies for UPS' own web pages. The net result is that no changes need to be made to on-line software applications 130 to enable external application to access the shipping vendor's on-line shipment services.

Figure 1C:
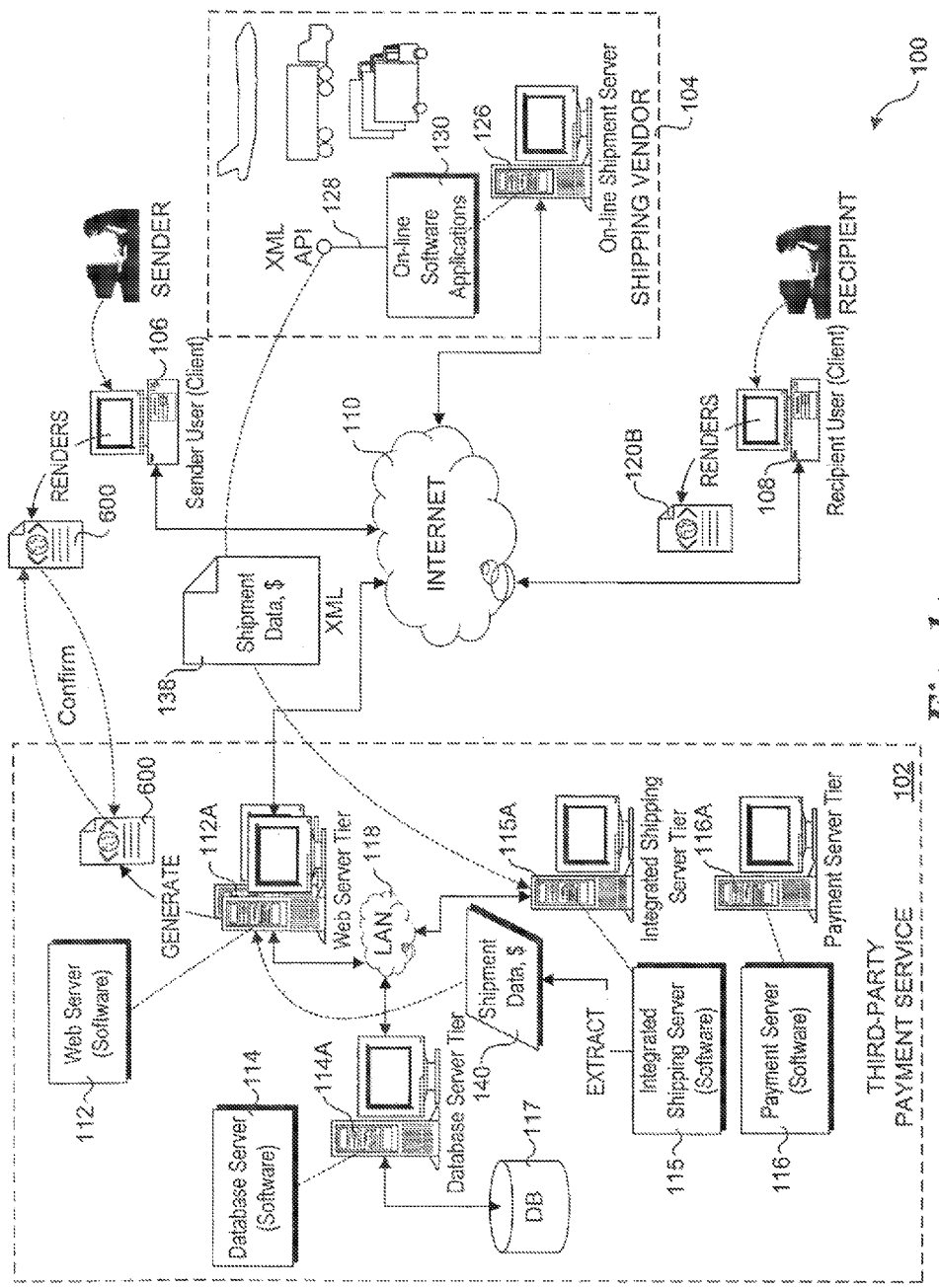

Once XML document 134 is generated, it sent from integrated shipping server 115 (via a server computer in integrated shipping server tier 115A) to shipping vendor 104 via on-line shipment server 126. In one embodiment, the HTTPS (Hyper-Text Transport Protocol Secure) protocol is employed for the transport. Generally, communications between shipping server tier 115A and on-line shipment server 126 may be over a public (e.g., Internet) or private (e.g., VPN (virtual private network) or dedicated link) network. Upon receipt of XML document 134, XML API 128 is employed to (effectively) automatically fill in appropriate data fields corresponding to virtual web pages hosted via on-line applications 130. One of the applications then calculates a shipping costs based on the input data (generally based on size and weight of the package in combination with the number of zones spanned by the Ship From: and Ship To: addresses, plus any miscellaneous charges such as optional insurance) in a block 210A. Additionally, an XML document 138 containing shipment data including the shipping cost is generated and passed back to third-party payment service 102 via integrated shipping server 115, as shown in FIG. 1c.

Figure 6:
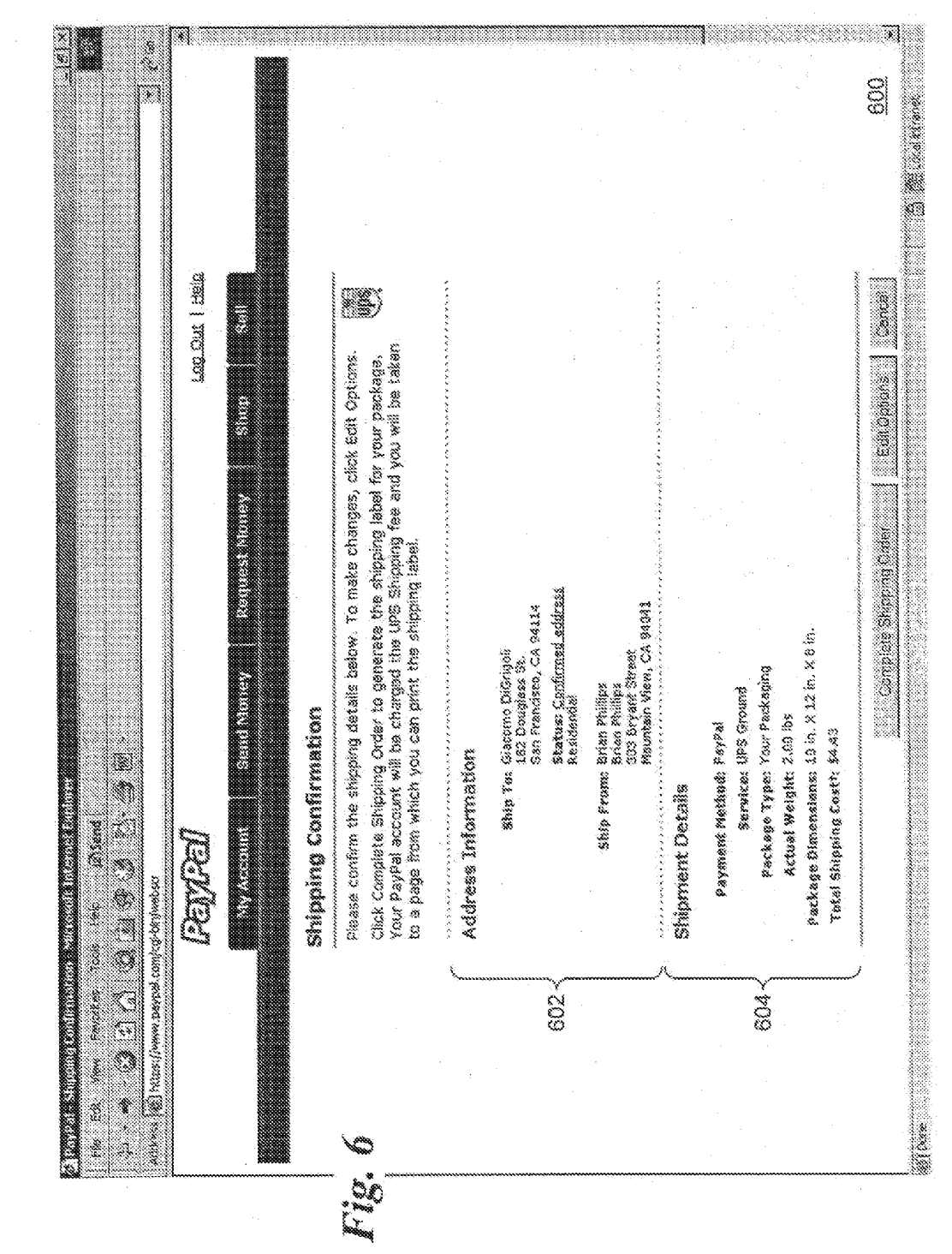

Upon receiving XML document 138, shipment data 140 is extracted and provided to web server 112 in a block 212. The web server then generates a confirmation page 600 shown in FIG. 6 and serves the page to sender client 106 in a block 214. Confirmation page 600 includes a verification of the Ship To: and Ship From: addresses in an Address Information section 602, and various details relating to the shipment in a Shipment Details section 604. These details include a payment method, selected service, package type, package weight and dimensions, and shipping cost. To confirm the order, the sender activates a "Complete Shipping Order" button 606.

Figure 1D:
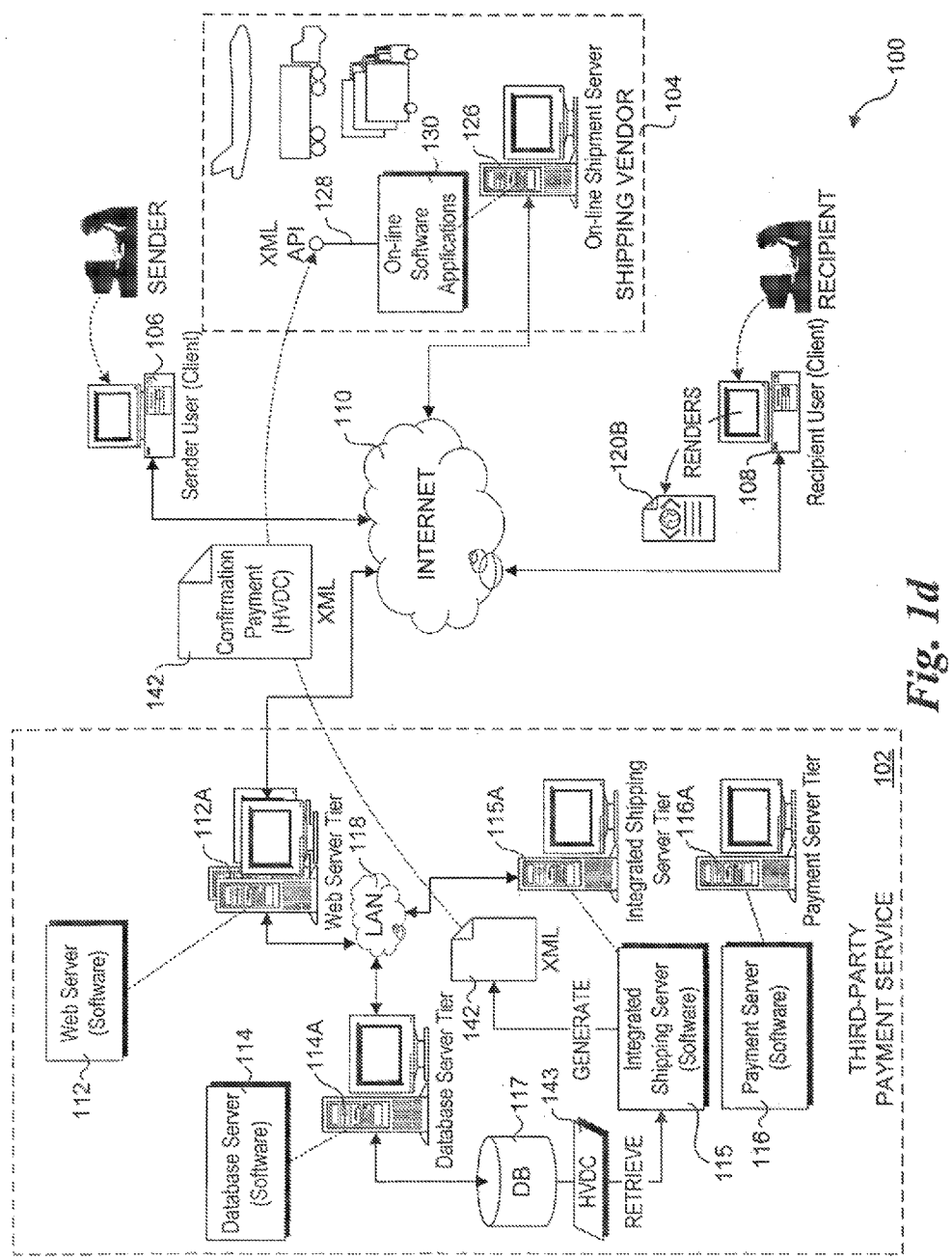
Figure 1E:
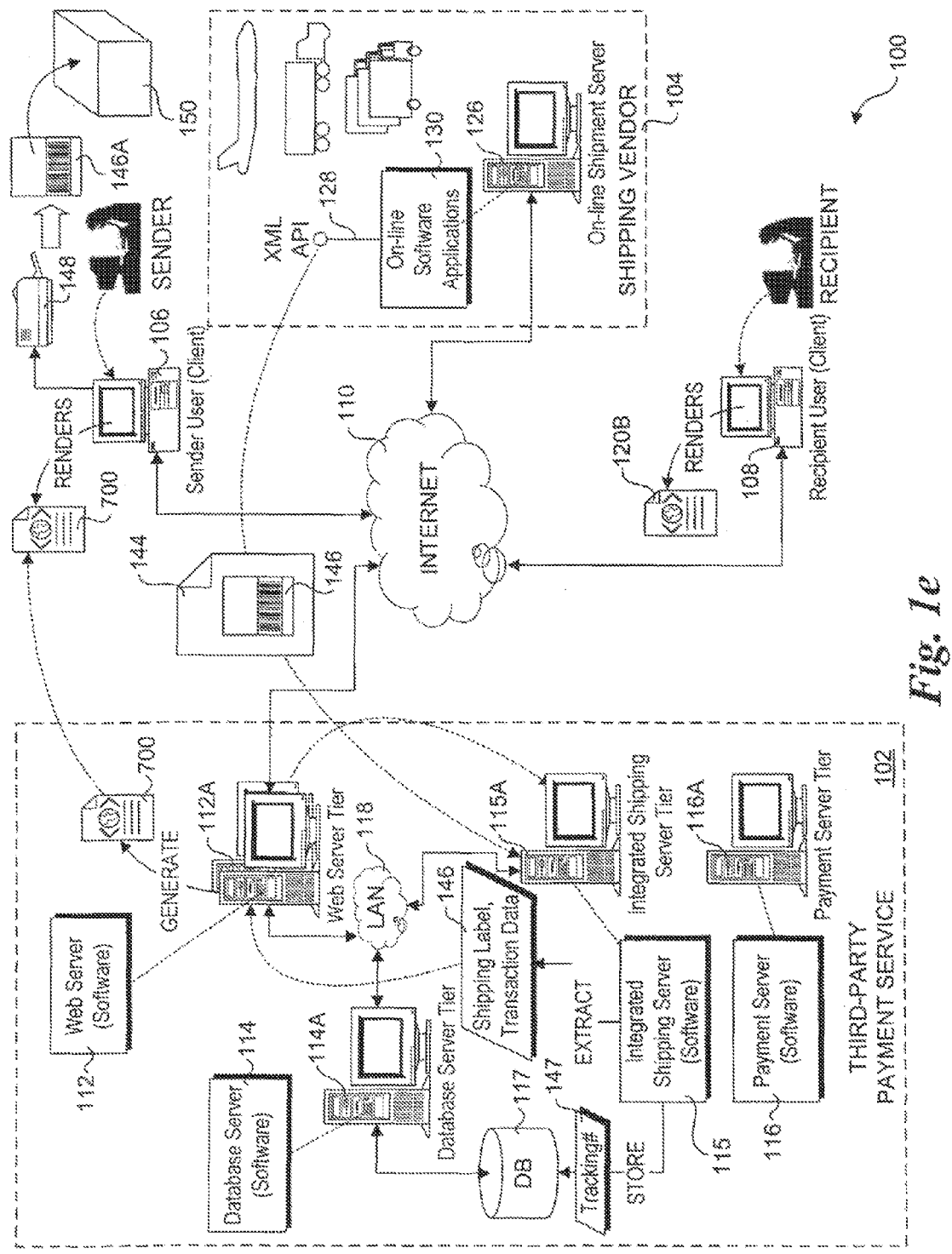

In response to the confirmation, web server 112 passes corresponding data to integrated shipping server 115, which generates an XML document 142 containing confirmation and payment information and sends the XML document to shipping vendor 104 in accordance with a block 216, as shown in FIG. 1d. In keeping with the idea of shipping vendor transparency, the payment information may conform to a payment type accepted by the shipping vendor. In one embodiment, a credit account is maintained by the third-party payment service with the shipping vendor, and thus the payment information comprises a credit account identifier (e.g., an account number). Under another embodiment, each shipment payment transaction is handled as an individual account, wherein payment is made using a normal payment facility accepted by the shipping vendor.

In accordance with this latter scheme, each integrated shipping user is assigned a unique "hidden virtual debit card" (HVDC). From the shipping vendor's perspective, the HVDC operates like an ordinary debit or credit card, enabling the vendor to settle the transaction in the manner normally handled for settlement for debit and credit card transactions, as described below in further detail with reference to FIGS. 8 and 9. The HVDC is termed "hidden" because the integrated shipping user is unaware of its use or existence. The HVDC is termed "virtual" because it does not correspond to a physical debit card (no such card may ever be produced), but rather corresponds to a virtual card that only exists in the computer systems of the debit card issuer, payment service, and shipping vendor. As depicted in FIG. 1d, the user's HVDC 143 is retrieved from database 117 to be included in XML document 142

Figure 7:
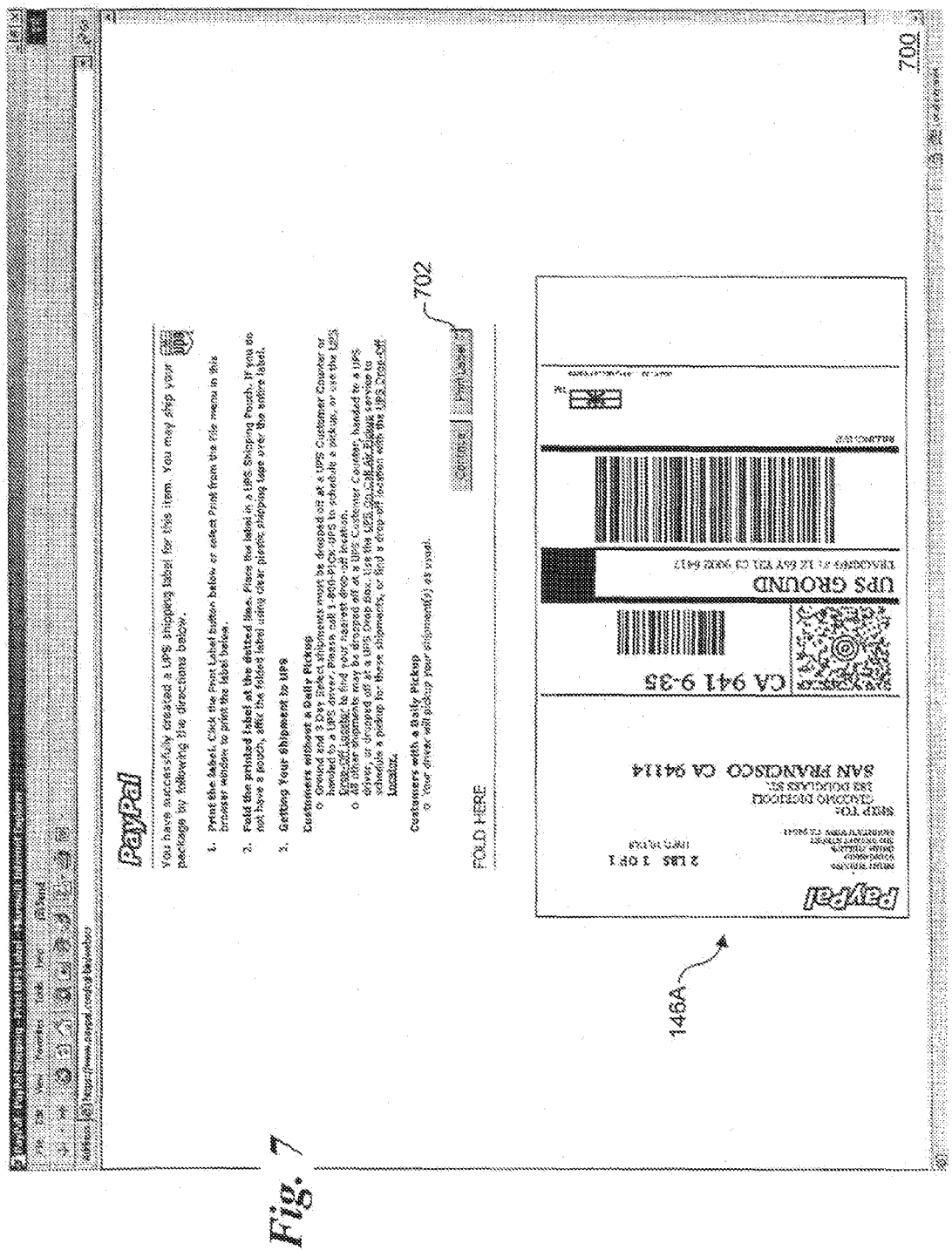
FIG. 7 is a representation of a web page containing a shipping label that may be printed out and attached to a package to be sent via the shipping vendor.

Upon receipt of XML document 142, the document's data are extracted via XML API 128 and the payment is authorized by the shipping vendor via the Debit/Credit card authorization/settlement infrastructure described below. An XML document 144 containing shipment transaction data including an embedded shipping label 146 is then generated and returned to third-party payment service 102. In a block 218, XML document 144 is received and the embedded shipping label and transaction data are extracted and passed to web server 112. A shipping label page 700 shown in FIG. 7 is then generated by web server 112 in a block 220 and served to sender client 106. Additionally, transaction data, including a shipment tracking number 147 are stored in database 117.

Shipping label page 700 contains a printable shipping label 146A derived from shipping label data 146. Typically, the shipping label data will be in a conventional graphic format that can be rendered by a web browser, such as a binary bitmap, TIFF, Adobe PDF, etc. If necessary, an appropriate plug-in for rendering the shipping label will be provided to the recipient client (e.g., via a download link or the like). To complete the shipment transaction process (from the sender's point of view), the sender will activate a "Print Label" button 700, causing the web page to be printed out on a printer 148. A printed label 146B is then applied to a package 150, and the package is either dropped off or picked up by personnel working for the shipping vendor.

Figure 8:
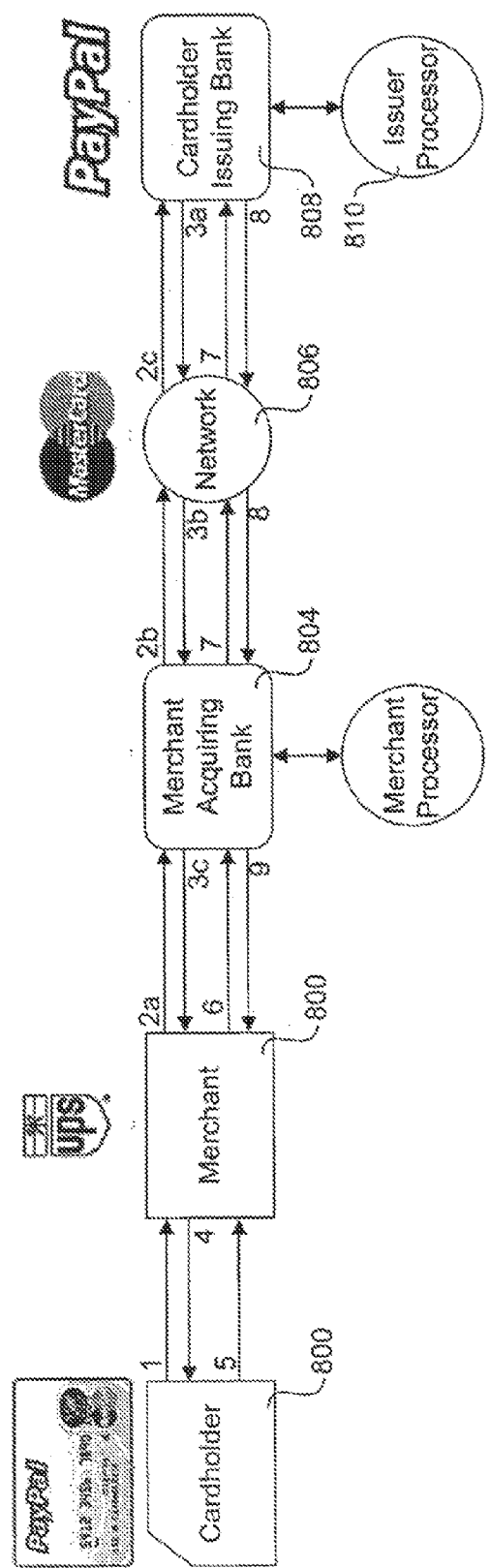
FIG. 8 is a schematic diagram illustrating entities and interactions involved in transferring payments via a credit card network.

Continuing with the flowchart of FIG. 2, the next operation is performed in a block 222, wherein the shipping cost is settled with the shipping vendor. Further details of settlement and the foregoing authorization process of block 216A are illustrated in FIGS. 8 and 9. The process begins in a block 900, wherein a cardholder 800 initiates payment for a purchase (of shipping services) from a merchant 802 (the shipping vendor). This action is performed behind the scenes via payment server 116, which presents a hidden virtual debit card comprising a 16-digit MasterCard on behalf of the user to the merchant (UPS) via a private banking network (not shown). In a block 902, the merchant submits an authorization request to the authorization/settlement network. This includes three sub-operations, beginning in a block 902A, wherein a merchant acquiring bank 804 passes an authorization request to the debit/credit card network 806. In a block 902B, the network (Mastercard in this example) passes the authorization request to the debit card issuing bank 808, which in this case is third-party payment service 102 (e.g., PayPal®). The issuing bank then interfaces with an issuer processor 810 to approve or deny the authorization request in a block 902C. This decision is made, in part by retrieving user account balance information and/or other user-related information from database 117 to verify whether sufficient funds are available to pay for the purchase. If the user account is insufficient, a web page is launched to enable the user to add more funds to his account (not shown).

In a block 904, the authorization response is return to merchant 802. This also involves three sub-operations, beginning with a block 904A, wherein issuing bank 808 returns the authorization response to network 806. In a block 904B the network returns the authorization response to merchant acquiring bank 804. Finally, in a block 906C the merchant acquiring bank returns the authorization response to merchant 802.

Next, if the authorization is approved, the merchant notes the transaction is a "card not present" transaction, meaning no cardholder signature is available (e.g., an Internet-based transaction) in a block 906. The merchant then stores a virtual sales draft in a block 908. Subsequently, the merchant submits a batch of transactions for settlement in a block 910. Batch settlement is typically performed oh a periodic basis, such as at the end of the business day.

The following day (typically), in a block 912 merchant acquiring bank 804 sends the transactions to network 806 and obtains payment for its transactions, less interchange fees and processing fees. Later that day, or the next day, the network sends transactions to issuing bank 808 and obtains funding for those transactions in a block 914. Interchange fees are added to the received funds, minus processing fees. Subsequently, the issuing bank funds the purchases less interchange fees, returns, and chargebacks and posts transactions to the cardholder (i.e., senders) account with third-party payment service 102 via payment server 116. The process is completed in a block 916, wherein the acquiring bank 804 credits merchant 802 for purchases, minus interchange fees, credit vouchers (representing returns), chargebacks (representing issuer or cardholder disputes), network fees, and its own acquiring fees.

Returning to FIG. 2, the last operation of the shipment transaction process is performed in a block 224, wherein the shipping cost is deducted from the sender's account with the third-party payment service. This is accomplished by storing data in database 117 that reflects the hidden virtual debit cards transactions for each integrated shipping user, and then adjusting each user's account balance based on the HVDC transactions made by that user. The timing of this operation relative to settlement is a matter of choice, meaning it may occur before or after (illustrated) shipping vendor settlement. In one embodiment, a user's account available balance is adjusted in response to an approved authorization. If settlement does not occur within a predetermined timeframe, the authorization is revoked, canceling the transaction, and the user's available account balance is adjusted to it prior value.

In addition to facilitating the arrangement of shipping goods, in one embodiment integrated shipping further provides a mechanism for a user to track shipments via the third-party payment service. As before, the third-party payment service functions as a proxy to enable access to shipment tracking data maintained by the shipping vendor using the aforementioned XML data transfer scheme.

Figure 10A:
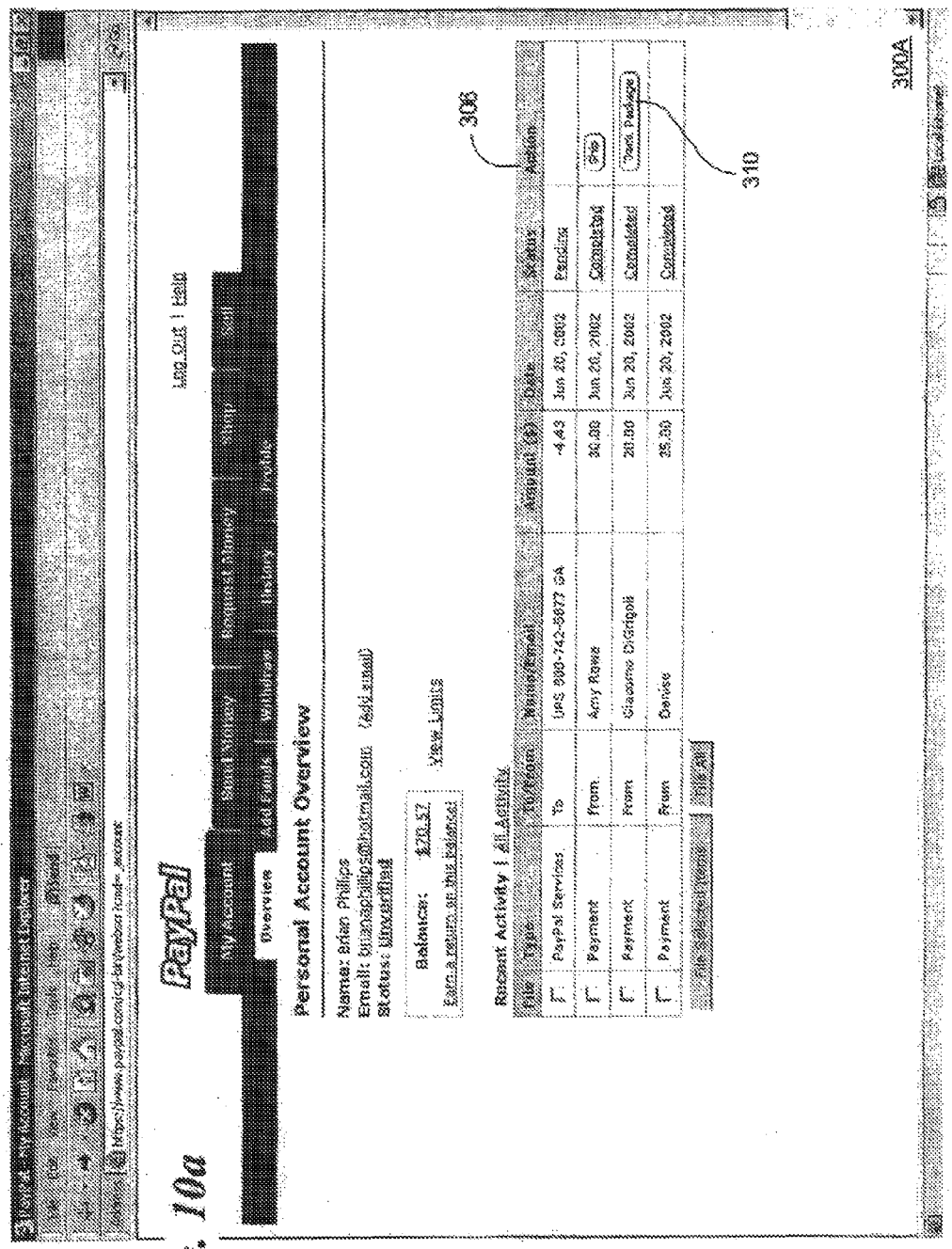
FIG. 10a is a representation of the personal account web page of FIG. 3, now containing a package tracking option.
Figure 10B:
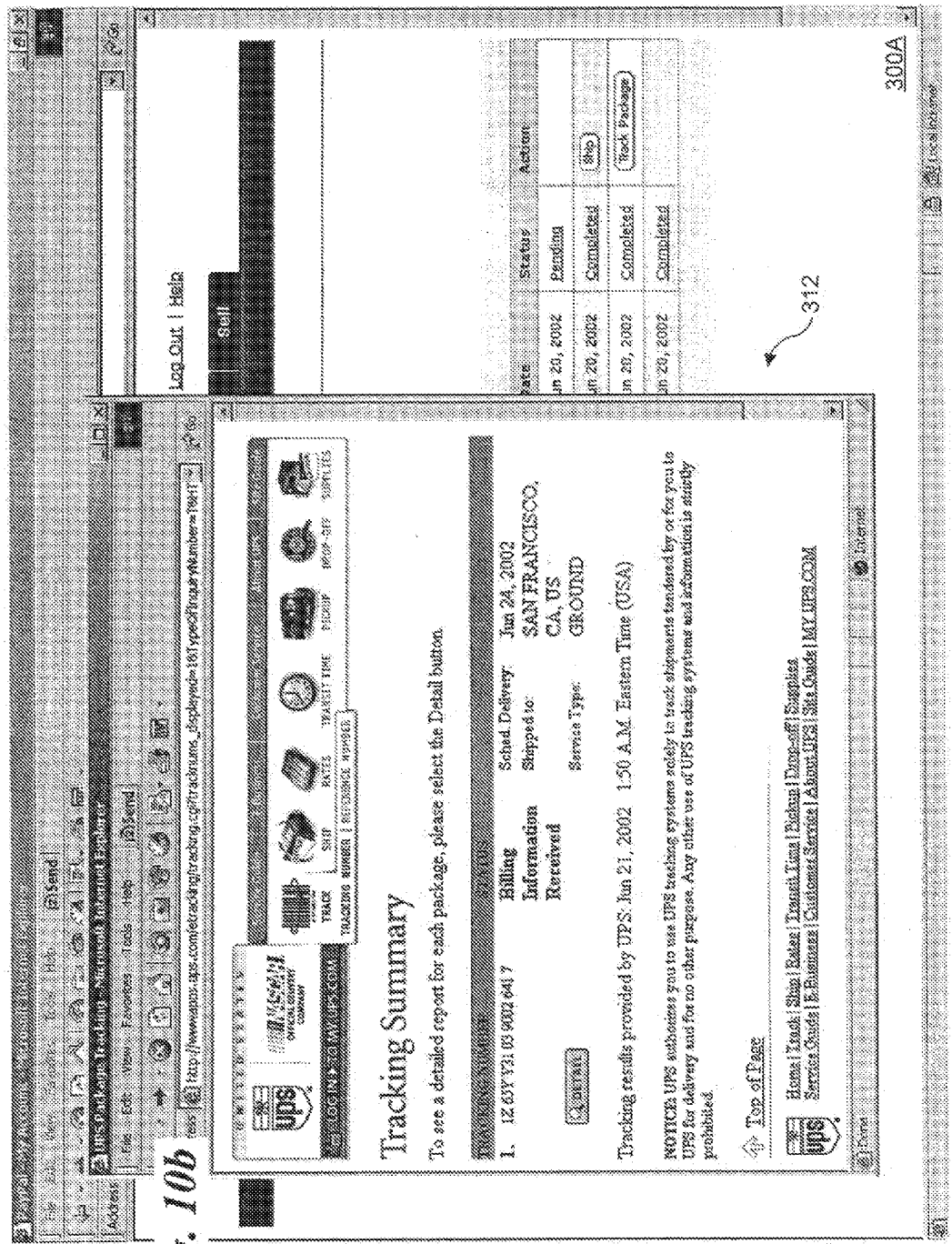
FIG. 10b is a representation of a browser display including the web page of FIG. 10a and an overlapping tracking summary web page hosted by the shipping vendor.

An exemplary use of the shipment-tracking feature is shown in FIGS. 10a and 10b. This time, when the user navigates to a review his or her personal account information, a personal accounts page 300A is rendered. "Action" column 306 now contains a "Track Package" button 310. In response to activation of this button, the tracking number for the corresponding transaction is retrieved from database 117, and web server 112 navigates to the shipment tracking page on UPS' web site and enters the retrieved tracking number. The web server 112 then directs the UPS web server to serve a resulting tracking summary page 312 to client 106, as shown in FIG. 10b. At this point, the user may access further features provided by the UPS site.

In addition, an e-mail containing a link to a shipment tracking page with a pre-populated tracking number may be sent to the recipient at the time of shipment. For example, a sender may want to apprize a recipient via an e-mail that he or she will be receiving a shipment, with a convenient link to track the shipment. The recipient's e-mail address that was previously entered in edit box 515 is retrieved from the database and an e-mail message is automatically generated containing the link.

In general, data related to vendor shipping accounts, shipments, payment transactions, and users will be stored in database 117. Typically, database 117 may comprise a relational database management system (RDBMS) database, such as SQL (structured query language) database. Accordingly, database server 114 may comprise a SQL RDBMS database server, such as database server products provided by Oracle (e.g., 8i or 9i), IBM (DB2), Sybase, Informix, and Microsoft (e.g., SQL Server 7 or 2000).

Figure 11:
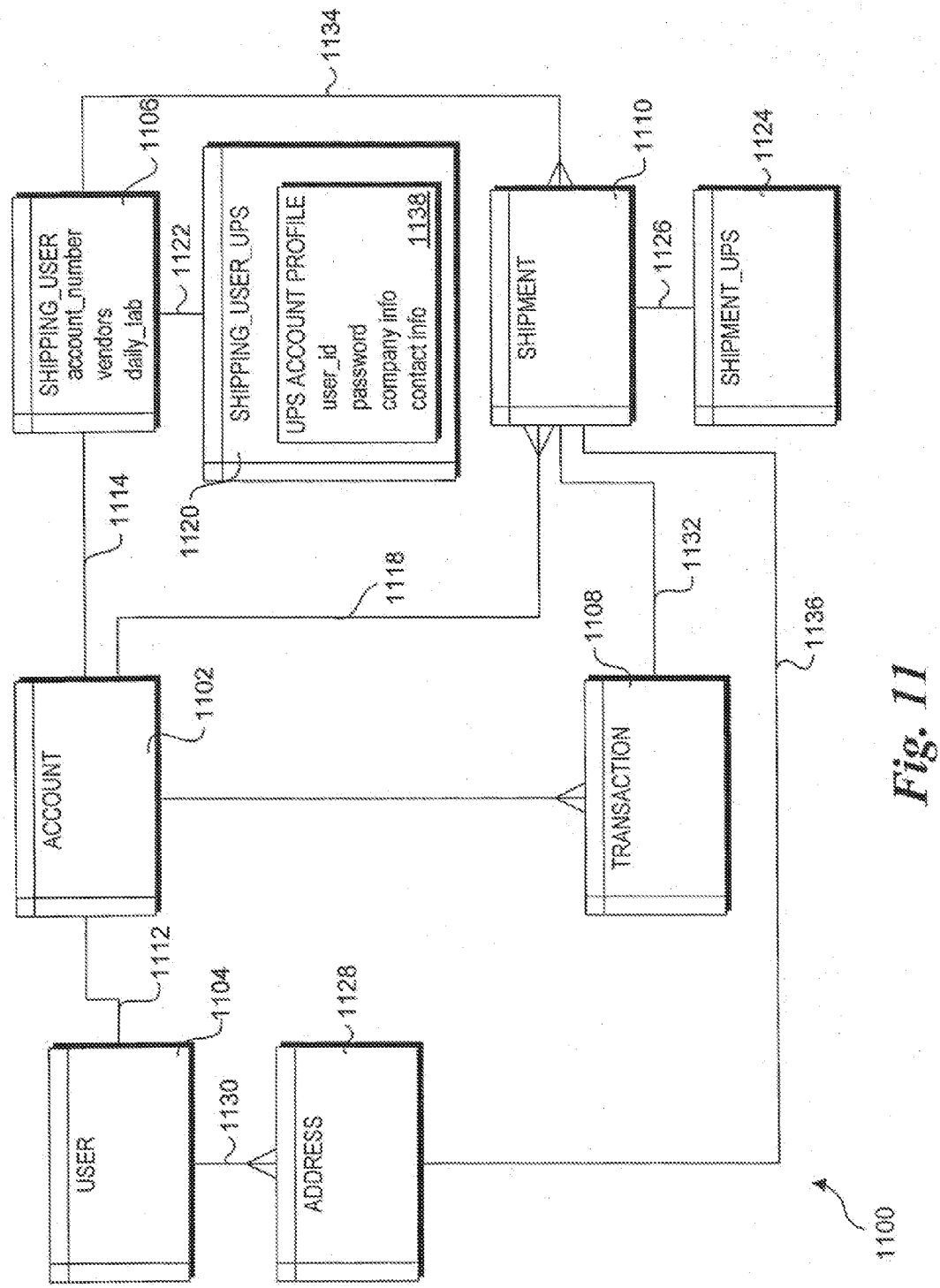
FIG. 11 is a schematic diagram illustrating a portion of a database schema in accordance with one embodiment of the invention.

A portion of an exemplary database schema 1100 for implementing data storage aspects of the invention is shown in FIG. 11. Central to database schema 1100 is an ACCOUNT table 1102. Each of USER table 1104, SHIPPING_USER table 1106, TRANSACTION table 1108, and SHIPMENT table 1110 is linked to ACCOUNT table 1102 via respective relationships 1112, 1114, 1116, and 1118. A SHIPPING_USER_UPS table 1120 is linked to SHIPPING_USER table 1106 via a relationship 1122. A SHIPMENT_UPS table 1124 is linked to SHIPMENT table 1110 via a relationship 1126, while an ADDRESS table 1128 is linked to USER table 1104 via a relationship 1130. In addition, SHIPMENT table 1110 is linked to TRANSACTION table 1108 via a relationship 1132, to SHIPPING_USER table 1106 via a relationship 1134, and to ADDRESS table 1128 via a relationship 1136.

Basic user account information, including a primary key user account number is stored in ACCOUNT table 1102. Detailed user information is stored in USER table 1104, while user address information is stored in ADDRESS table 1128. Payment transaction data are stored in TRANSACTION table 1108.

Integrated shipping user information is stored in SHIPPING_USER table 1106, including information identifying the user's account number (the foreign key link to ACCOUNT table 1102, and shipping vendors for which the user has an account. A daily tabulation (daily_tab) is maintained for each user to limit the amount of shipment purchases users may have during a single day to a predetermined limit. The purpose of this purchase limit is to prevent fraudulent use of the account.

SHIPPING_USERS_UPS table 1120 is exemplary of a shipping vendor user table in which vendor-relating account data are stored. For example, SHIPPING_USER_UPS table 1120 contains an account profile section 1138 in which shipping vendor account data are stored, including a user_id, password, along with optional company and contact information.

Data related to shipments are stored in SHIPMENT table 1110. These data include basic shipment information, such as vendor, weight, monetary value, transportation value, etc., and shipper/shippee (i.e., sender/recipient in the foregoing examples) information, including account numbers, transactions id's and address id's. It is noted that if the shipment recipient (the shippee) does not have an account with third-party payment service 102, no shippee account number and address id will be stored.

Shipment data particular to the shipping vendor is stored in SHIPMENT_UPS table 1124. In one embodiment, these data include packaging options, package dimensions, tracking number, shipping options, a shipping label (as a BLOB datatype), and a shipper id. Generally, a respective pair of tables similar to SHIPPING_USER_UPS table 1120 and SHIPMENT_UPS table 1124 will exist for each shipping vendor, and will include data fields particular to that shipping vendor.

In the foregoing examples, data was passed between the third-party payment service and the shipping vendor using an XML data-exchange mechanism. This is not meant to be limiting, but merely illustrative of one means for exchanging data. Other data-exchange techniques may also be employed, such as proprietary techniques, text-based techniques, database data-exchange, etc.

Exemplary Computer Server System

Figure 12:
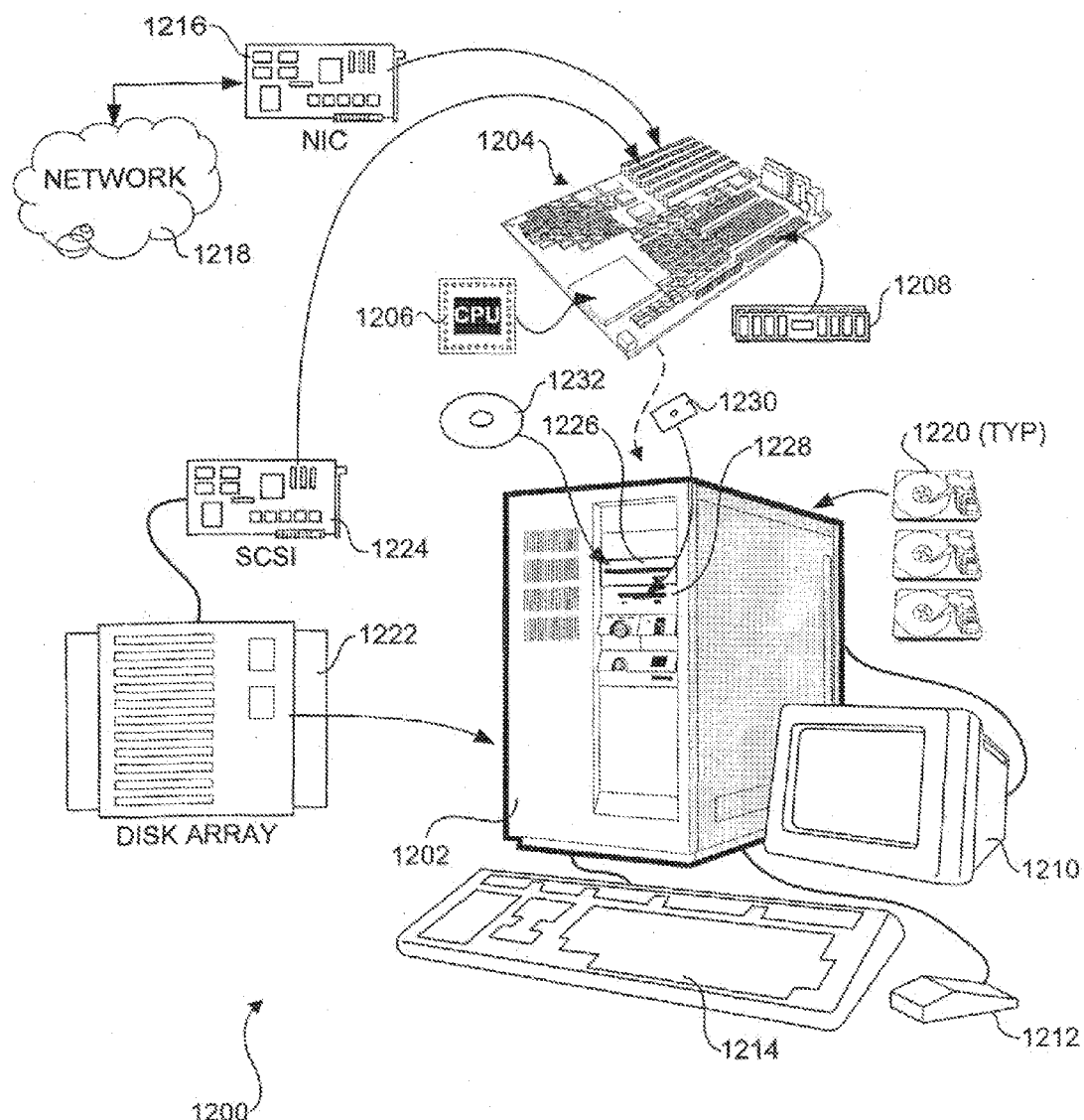
FIG. 12 is a schematic diagram of a computer server that may be employed for various computer servers illustrated in the drawings contained herein.

With reference to FIG. 12, a generally conventional computer server 1200 is illustrated that is suitable for use in connection with practicing the embodiments of the invention discussed herein. For example, computer server 1200 may be used for running web server 112, database server 114, integrated shipping server 115, payment server 116, and on-line software applications 130. Examples of computer servers that may be suitable for these purposes include stand-alone and enterprise-class servers operating UNIX-based and LINUX-based operating systems, as well as servers running the Windows NT or Windows 2000 Server operating systems.

Computer server 1200 includes a chassis 1202 in which is mounted a motherboard 1204 populated with appropriate integrated circuits, including one or more processors 1206 and memory (e.g., DIMMs or SIMMs) 1208, as is generally well known to those skill in the computer arts. The motherboard and various peripheral devices described below are powered by a power supply (not shown). A monitor 1210 is included for displaying graphics and text generated by software programs and program modules that are run by the computer server. A mouse 1212 (or other pointing device) may be connected to a serial port (or to a bus port or USB port) on the rear of chassis 1202, and signals from mouse 1212 are conveyed to the motherboard to control a cursor on the display and to select text, menu options, and graphic components displayed on monitor 1210 by software programs and modules executing on the computer, such as the web pages illustrated herein. In addition, a keyboard 1214 is coupled to the motherboard for user entry of text and commands that affect the running of software programs executing on the computer. Computer server 1200 also includes a network interface card (NIC) 1216, or equivalent circuitry built into the motherboard to enable the server to send and receive data via a network 1218.

File system storage corresponding may be implemented via a plurality of hard disks 1220 that are stored internally within chassis 1202, and/or via a plurality of hard disks that are stored in an external disk array 1222 that may be accessed via a SCSI card 1224 or equivalent SCSI circuitry built into the motherboard. Optionally, disk array 1222 may be accessed using a Fibre Channel link using an appropriate Fibre Channel interface card (not shown) or built-in circuitry.

Computer server 1200 generally may include a compact disk-read only memory (CD-ROM) drive 1226 into which a CD-ROM disk may be inserted so that executable files and data on the disk can be read for transfer into memory 1208 and/or into storage on hard disk 1220. Similarly, a floppy drive 1228 may be provided for such purposes. Other mass memory storage devices such as an optical recorded medium or DVD drive may also be included. The machine instructions comprising the software components that cause processor(s) 1206 to implement the operations of the present invention that have been discussed above will typically be distributed on floppy disks 1230 or CD-ROMs 1232 (or other memory media) and stored in one or more hard disks 1220 until loaded into memory 1208 for execution by processor(s) 1206. Optionally, the machine instructions may be loaded via network 1218 as a carrier wave file.

Thus, embodiments of this invention may be used as or to support software components executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
    a web server; and
    an integrated shipping server hosted by a third-party payment service, linked in communication with the web server,
    the web server and integrated shipping server, acting as an intermediary server between a sender and a shipping vendor, comprising software instructions that when executed enable the sender to arrange for shipment of a package to a recipient via the shipping vendor by performing operations, by the integrated shipping server, including:
    generating and serving web pages via which shipping information including sender address is automatically entered into the web pages based on a current user session and an applicable mode, the shipping information being listed with the third-party payment service;
    registering the sender with the shipping vendor based on the shipping information;
    arranging for the shipment of the package via the shipping vendor, as the sender's a proxy of the sender;
    interacting with an on-line interface hosted by the shipping vendor, as if an individual user is directly accessing the on-line interface;
    receiving shipping data pertaining to the shipment from the shipping vendor, said the shipping data including data corresponding to a shipping label; and generating and serving a web page via which the shipping label may be printed.

2. The system of claim 1, further comprising a payment server linked in communication with the integrated shipping server and comprising further software instructions that when executed perform the operation of facilitating payment for the shipment from the seller to the shipping vendor.

3. The system of claim 2, wherein the system is configured to be operable by a third-party payment service for which the seller has an account, and facilitating payment of the shipment comprises:
    providing payment from the third-party payment service to the shipping vendor; and
    deducting a shipping cost of the shipment from the seller's a third-party payment service account of the seller.

4. The system of claim 3, wherein payment from the third-party payment service to the shipping vendor is facilitated via interaction between the payment server and a debit/credit card authorization/settlement network.

5. The system of claim 4, wherein execution of the software instructions further performs the operations of:
    generating a virtual debit card; and
    employing the virtual debit card to pay the shipping vendor.

6. The system of claim 5, wherein the virtual debit card is associated with the third-party payment service.

7. The system of claim 1, wherein execution of the software instructions further performs the operation of communicating a document containing shipping information and sender account information to the shipping vendor.

8. The system of claim 1, wherein execution of the software instructions further performs the operation of communicating a document containing confirmation and payment information to the shipping vendor to the shipping vendor.

9. The system of claim 1, wherein execution of the software instructions further performs the operation of receiving the cost of the shipment and shipment options from the shipping vendor.

* * * * *

UNITED STATES PATENT AND TRADEMARK OFFICE
CERTIFICATE OF CORRECTION

PATENT NO.         : 7,844,497 B2
APPLICATION NO.    : 10/749682
DATED              : November 30, 2010
INVENTOR(S)        : Brian A. Phillips et al.

It is certified that error appears in the above-identified patent and that said Letters Patent is hereby corrected as shown below:

In The Drawings:

On Sheet 6 of 18, in Box 206, in Figure 2, line 3, delete "VENDER" and insert -- VENDOR --, therefor.

In column 4, line 47, delete "by" and insert -- be --, therefor.

In column 7, lines 33-34, delete "an and" and insert -- and an --, therefor.

In column 9, line 7, delete "142" and insert -- 142. --, therefor.

In column 10, line 10, delete "oh" and insert -- on --, therefor.

In columns 13, lines 34-50, column 14, lines 1-12, in claim 1, delete
"1. A system comprising:
a web server; and
an integrated shipping server hosted by a third party third-party payment service,
    linked in communication with the web server,
the web server and integrated shipping server, acting as an intermediary server between a sender
    and a shipping vendor, comprising software instructions that when executed enable the
    sender to arrange for shipment of a package to a recipient via the shipping vendor by
    performing operations, by the integrated shipping server, including:
generating and serving web pages via which shipping information including sender address is
    automatically entered into the web pages based on a current user session and an applicable
    mode, the shipping information being listed with the third-party payment service;
registering the sender with the shipping vendor based on the shipping information;
arranging for the shipment of the package via the shipping vendor, as the sender's a proxy of the
    sender;

Signed and Sealed this
Fifteenth Day of February, 2011

David J. Kappos
*Director of the United States Patent and Trademark Office* interacting with an on-line interface hosted by the shipping vendor, as if an individual user is
      directly accessing the on-line interface;
receiving shipping data pertaining to the shipment from the shipping vendor, said the shipping
      data including data corresponding to a shipping label; and generating and serving a web
page via which the shipping label may be printed."
and insert -- 1. A system comprising:
a web server; and
an integrated shipping server hosted by a third party third-party payment service,
   linked in communication with the web server,
the web server and integrated shipping server, acting as an intermediary server between a sender
      and a shipping vendor, comprising software instructions that when executed enable the sender
      to arrange for shipment of a package to a recipient via the shipping vendor by performing
      operations, by the integrated shipping server, including:
generating and serving web pages via which shipping information including sender address is
      automatically entered into the web pages based on a current user session and an applicable
      mode, the shipping information being listed with the third party payment service;
registering the sender with the shipping vendor based on the shipping information;
arranging for the shipment of the package via the shipping vendor, as a proxy of the sender;
interacting with an on-line interface hosted by the shipping vendor, as if an individual user is
      directly accessing the on-line interface;
receiving shipping data pertaining to the shipment from the shipping vendor, the shipping data
      including data corresponding to a shipping label; and
generating and serving a web page via which the shipping label may be printed. --, therefor.